May 11, 1965
J. ILLO
3,182,816
BAR UNSCRAMBLING MACHINE
Filed March 1, 1963
2 Sheets-Sheet 1
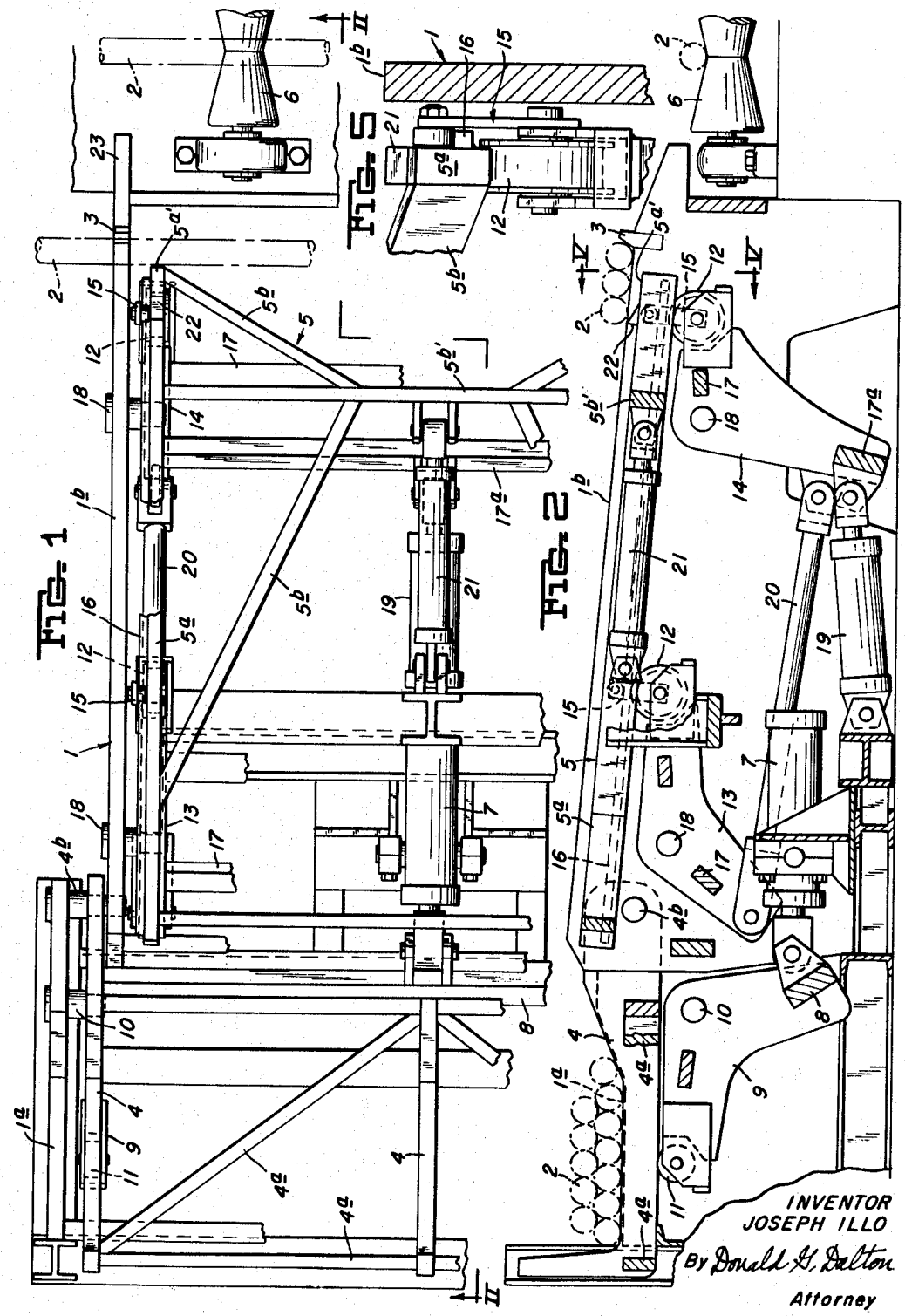
INVENTOR
JOSEPH ILLO
By Donald G. Dalton
Attorney May 11, 1965  J. ILLO  3,182,816
BAR UNSCRAMBLING MACHINE
Filed March 1, 1963  2 Sheets-Sheet 2
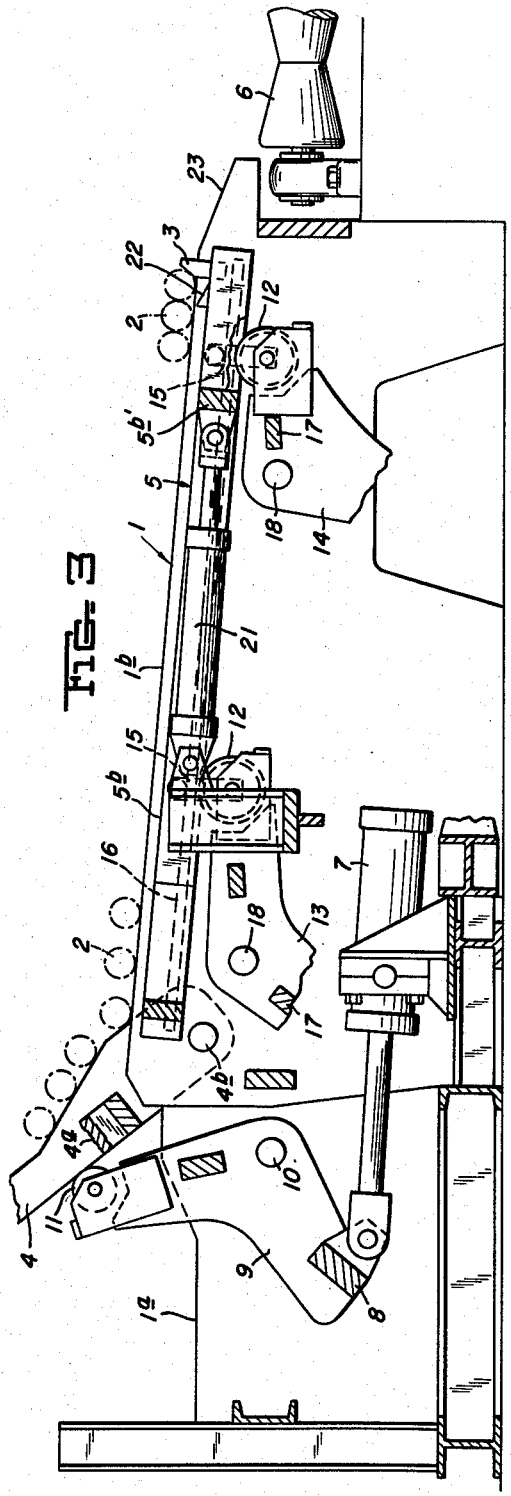
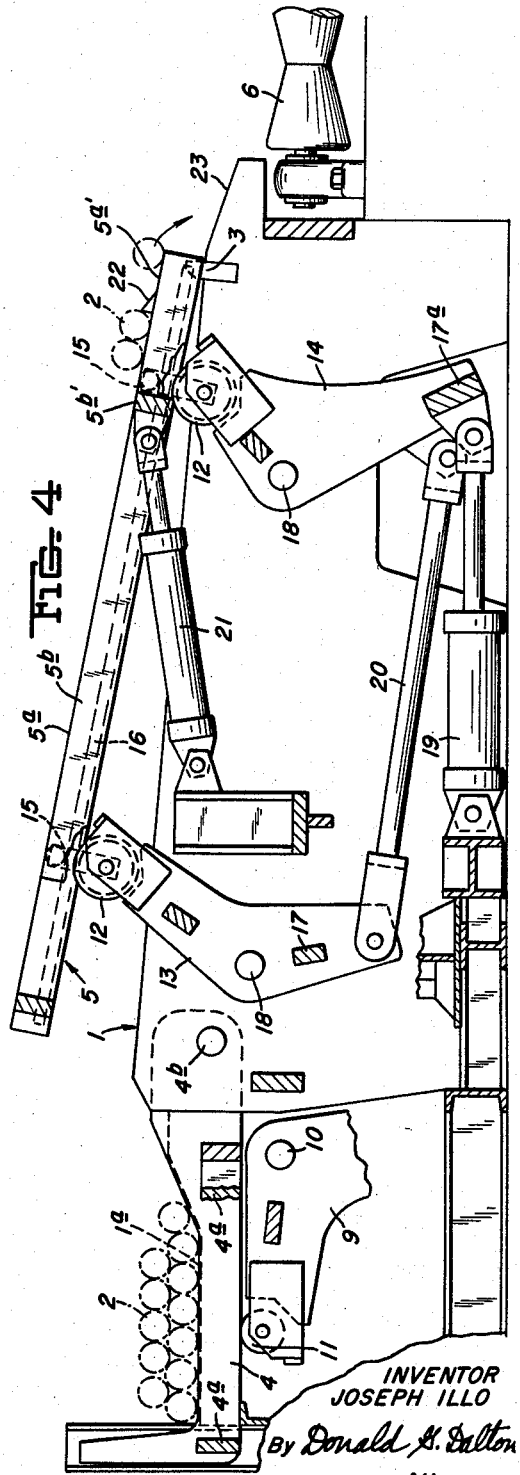
INVENTOR
JOSEPH ILLO
By Donald G. Dalton
Attorney United States Patent Office 3,182,816
Patented May 11, 1965

3,182,816
BAR UNSCRAMBLING MACHINE
Joseph Illo, Thornton Township, Cook County, Ill.
Filed Mar. 1, 1963, Ser. No. 262,155
7 Claims. (Cl. 214—1)

This invention relates to a machine for the transfer of bar product and the like, and more particularly to such mechanism for use in steel mills and the like for transferring round bars and similar products from one processing stage to another, especially under conditions where the bars to be transferred are in somewhat disarrayed piles and are required to be discharged singly and in predetermined positional alignment.

For instance, in the manufacture of round steel bars in rolling mills, the rolled product is cut into convenient lengths and placed into heat treating furnaces. In the process of heat treating and cooling, the bars become warped and distorted to the extent that they require straightening before shipment to the customer. These bars are temporarily stored in piles, and before they can be straightened they must be unscrambled and deposited one at a time, in proper alignment, upon the entry table of a bar straightener. This is a difficult and time consuming operation, a condition which the present invention was designed to alleviate.

This and other objects will become apparent from consideration of a specific embodiment of the invention, as presented in the drawings and described hereinafter.

In the drawings:

FIGURE 1 is a partial plan view of a machine representing an embodiment of the invention. This view includes one side of the structure and the driving mechanism located within it. For simplicity of presentation, remaining essentially duplicative structure, which is a mirror image of that shown, has been omitted.

FIGURE 2 is a vertical sectional view taken along the plane of line II—II of FIGURE 1.

FIGURES 3 and 4 are views similar to FIGURE 2, showing the machines in a sequence of operations.

FIGURE 5 is an enlarged detail view of a portion of the machine, taken along the plane of line V—V.

With further reference to the drawings, the machine depicted comprises a frame 1, fabricated from slabs and structural members, forming a generally box-like rectangular enclosure for the various operating mechanisms. Upper portions of the frame side rails 1a and 1b, perform the additional function of support members for bar product 2, with bars lying crosswise of the machine as depicted by the fragmentary bar shown in FIGURE 1, near the discharge end of the machine, to the right in the drawings. At the entry end of the machine, to the left in the drawings, the upper surface of frame 1 is relatively depressed to form staging table 1a, where bars may be placed in temporary storage to insure a readily available supply of bars for feeder table 1b. Similarly to the staging table 1a, the feeder table 1b is formed by the upper portion of frame 1, which to form the feeder table is inclined downwardly, towards the discharge end of the machine, to cause gravitation of bars in that direction. Table 1b is provided with bar retaining stops 3, against which the bar next to be discharged from the machine comes to rest, with the remaining bars on the feeder table backed up therebehind, as depicted in FIGURE 2 by bars 2 located near the discharge end of the machine. Stops 3 are desirably beveled, as shown, on their entry sides. Also, since bar discharge, as will be more fully described hereinafter, requires their manipulation over the stops, the stops are preferably of no greater height than necessary to prevent premature movement thereover of the bar next to be discharged, a height no greater than the diameter of the bars to be transferred being preferred.

The movable elements of the machine are represented by inclinable loading arms 4 and manipulative bed 5, with their associated actuating and connecting elements. By way of general description of these elements, loading arms 4 are inclinable to deliver bars from staging table 1a to feeder table 1b, and manipulative bed 5 manipulates bars resting upon the feeder table, towards the feeder table stops, if required, and over them for discharge to a bar straightener entry table 6, for example, shown schematically in the drawings.

The loading arms 4, of which three are contemplated in the embodiment illustrated in FIGURE 1, are connectively braced 4a for unitary movement. Inclination of the arms, as shown in FIGURE 4, is effected by means of a hydraulic cylinder type actuator 7, pivotally mounted on frame 1 and pivotally connected to cross-member 8 which joins bell cranks 9, pivoted on frame 1 at 10, and which transmit their movement to arms 4, pivoted about 4b, through friction reducing rollers 11 on the free ends of the bell cranks.

If desired, the loading arms 4, when properly supported, may serve as a staging table in lieu of table 1a previously mentioned.

The aforementioned manipulative bed, denoted generally by reference character 5, comprises side rails 5a, generally paralleling, and coextensive with, the previously mentioned feeder table members 1b. The bed incorporates necessary cross-bracing elements 5b to insure its operation as a unit.

The upper surfaces of the bed side rails 5a provide support for bars 2 extending crosswise thereof, similarly to that provided by feeder table 1b.

The lower surface of the bed side rails 5a operatively engage flanged rollers 12 mounted on bed supporting bell cranks 13 and 14. To insure the side rails remaining within the flanges it is preferable to employ a hold down member 15, detailed in FIGURE 5, one end of which is attached to the roller involved and the other end of which, carrying a small roller, rides on flange 16.

Bell cranks 13 and 14 are joined by appropriate cross members 17, to insure unitary movement of each pair of cranks. The cranks are pivoted on frame 1 about points 18. The cranks are driven by a hydraulic cylinder type actuator 19 pivotally mounted on frame 1 and with its working end pivotally attached to cross member 17a connecting the lower arms of bell cranks 14. Movement of bell cranks 14 is transmitted to bell cranks 13 by means of tierods 20 pivotally connected between the lower ends of the pairs of cranks.

Actuation of hydraulic actuator 19 occasions rotation of bell cranks 13, 14 about pivots 18, resulting in motion of the free ends of the cranks, which motion contains a vertical component which is transmitted to bed 5 through rolls 12.

The relative lengths of the lever arms of bell cranks 13, 14, supporting the fore and aft ends of bed 5, are so chosen that for a given vertical motion of the free end of crank 14, a somewhat magnified vertical motion is experienced by crank 13, resulting in a variation in bed tilt accompanying its raising and lowering.

Controlled positioning of bed 5, lengthwise of the machine is accomplished by means of hydraulic cylinder type actuator 21 pivotally attached to frame 1 and to bed cross member 5b', the bed travelling to and fro, in guided movement, upon flanged rolls 12.

From the foregoing description, it will be appreciated that the manipulative bed is capable of both vertical and horizontal motion, and variation of tilt, in relation to feeder table 1b. This motion is usually operator controlled, but in repetitive situations may be subject to automatic control.

The upper surfaces of side rails 5a are provided with bar retaining stops 22. These are located at a sufficient distance from the discharge end of the bed to leave a section of bar supporting surface 5a' extending therebeyond to provide upward bar support for an individual bar being raised over bar stop 3, after having been cradled between the two sets of bar stops 3 and 22. Stops 22 are preferably wedge shaped, as shown, to permit picking off a single bar from a plurality thereof resting on feeder table 1b. Their height is dictated by essentially the same considerations as applied to stops 3.

The nature of the invention will become further apparent from consideration of operational sequences presented in the various figures of the drawings.

Loading the feeder table 1b is accomplished by transfer of bars 2 from staging table 1a, shown in FIGURE 2, by inclining loading arms 4 as shown in FIGURE 3. The bars will tend to gravitate along inclined feeder bed 1b until coming to rest, backed up against stop 3. Bars not reaching this position, as shown in FIGURE 2, may be urged along by raising bed 5, as depicted in FIGURE 4, whereupon bars on feeder table 1b are lifted, and by virtue of the relatively great tilt of bed 5, gravitate against stops 22 on the manipulative bed. The bed is then lowered to redeposit the bars upon feeder table 1b, just short of stops 3. Additional manipulation of the bars, if required, may be made by nudging them with stops 22, by appropriate bed manipulation, an object being to have one bar rest against stop 3.

A bar resting against stop 3 is lifted thereover for discharge by so moving manipulative bed 5 that wedge-shaped stop 22 is so positioned, as shown in FIGURE 3, that upon raising the bed a single bar will be cooperatively cradled between stops 3 and 22. Upon the bed being further raised, supporting surface 5b', the aforementioned extension of bar supporting surface beyond stops 22, provides upward support for the bar, whereby upon further raising of the bed the bar clears stops 3, and by virtue of the tilt of the bed, is discharged over the stops, to skids 23, integral with frame 1.

Repetition of bed manipulation for discharge results in repetitive tilting of the bed, which tends to keep bars worked, in orderly array, towards the discharge end of the machine, without special attention thereto.

While my invention has been described with particular reference to a specific embodiment, this has been done to permit its ready practice and it will be apparent that adaptations and modifications may be made without departing from the scope of the following claims.

I claim:

1. A machine for the unscrambling and transfer of bars and the like, capable of receiving a plurality of disarrayed and distorted bars and discharging them singly in predetermined positional alignment, said machine comprising a feeder table having members for supporting a plurality of bars crosswise of the machine, said table being generally inclined downwardly towards the discharge end of the machine, to permit gravitation of bars in that direction, and having a single parallel row of bar retaining stops short of the point of discharge, said stops being of suitable shape and size to retain a single bar, without excessive height for ready raising of bars thereover for discharge; a manipulative bed cooperatively arranged with respect to said feeder table, the upper surfaces of said bed being generally coextensive, lengthwise, with the bar supporting members of the feeder table and being similarly capable of crosswise support of bars and their gravitational advancement, said upper surfaces having a single parallel row of bar retaining stops thereon, said stops being of shape and size, and positioned with respect to the discharge end of the bed to leave a section of bar supporting surface extending therebeyond, so that by appropriate bed manipulation a single bar, resting against feeder table bar stops, may be selected and cradled between table and bed bar retaining stops while receiving upward support from said section of bed extending beyond its stops; and means for manipulation of said bed comprising means for selectively varying its position in relation to said feeder table as regards raising, lowering, and degree of inclination, together with independent means for selective to and fro manipulative movement, whereby bars resting upon said feeder table may be manipulated towards and over its stops for discharge.

2. The machine of claim 1, incorporating a staging table with inclinable loading arms, said loading arms being pivoted at the entry end of said feeder table and adapted to discharge upon said feeder table, by gravity flow, bars deposited thereon.

3. The machine of claim 1 in which said means for raising and lowering said manipulative bed, and for varying bed tilt, comprise actuatable fore and aft bell cranks supporting said bed, coupling means for the free ends thereof to permit unitary actuation, said fore and aft bell cranks being of unequal effective arm lengths to impart varying bed tilt during bed raising and lowering.

4. The machine of claim 3 in which means for actuation of said bell cranks comprise a ram type hydraulic actuating cylinder assembly.

5. The machine of claim 1 in which said manipulative bed raising and lowering means comprise members having a vertical motion component providing upward support to said bed, said members engaging said bed through means permitting guided to and fro movement of said bed relative to said vertically movable members.

6. The machine of claim 5 in which means for imparting said to and fro bed movement comprise a ram type hydraulic actuating cylinder assembly.

7. The machine of claim 5 in which said guided to and fro bed movement means comprise flanged rollers attached to the bed engaging portion of said vertically movable bed support members.

References Cited by the Examiner

UNITED STATES PATENTS

| | | |
|---|---|---|
| 1,911,106 | 5/33 | Camerota. |
| 1,965,868 | 7/34 | Vickers _____ 80—42 X |
| 2,043,556 | 6/36 | Protin. |

FOREIGN PATENTS

| | | |
|---|---|---|
| 392,654 | 3/24 | Germany. |
| 431,060 | 7/26 | Germany. |

HUGO O. SCHULZ, *Primary Examiner.*